US011507962B2

(12) United States Patent
Ruvini et al.

(10) Patent No.: US 11,507,962 B2
(45) Date of Patent: Nov. 22, 2022

(54) COUNTERFEIT ITEM DETECTION SYSTEM

(71) Applicant: eBay Inc., San Jose, CA (US)

(72) Inventors: Jean-David Ruvini, Mountain View, CA (US); Ramesh Periyathambi, San Ramon, CA (US); Lakshimi Duraivenkatesh, San Ramon, CA (US)

(73) Assignee: eBay Inc., San Jose, CA (US)

( * ) Notice: Subject to any disclaimer, the term of this patent is extended or adjusted under 35 U.S.C. 154(b) by 137 days.

(21) Appl. No.: 17/028,155

(22) Filed: Sep. 22, 2020

(65) Prior Publication Data

US 2022/0092608 A1 Mar. 24, 2022

(51) Int. Cl.
*G06Q 30/00* (2012.01)
*G06F 40/35* (2020.01)
*G06Q 30/06* (2012.01)

(52) U.S. Cl.
CPC ......... *G06Q 30/0185* (2013.01); *G06F 40/35* (2020.01); *G06Q 30/0609* (2013.01); *G06Q 30/0627* (2013.01); *G06Q 30/0641* (2013.01)

(58) Field of Classification Search
CPC ........... G06Q 30/0185; G06Q 30/0609; G06Q 30/0627; G06F 40/35; G06F 40/30
See application file for complete search history.

(56) References Cited

U.S. PATENT DOCUMENTS

| 9,372,896 | B1 | 6/2016 | Grundman | |
| 10,977,708 | B2 * | 4/2021 | Goens | G06Q 30/018 |
| 11,322,139 | B2 * | 5/2022 | Jones | G06F 3/0484 |

(Continued)

FOREIGN PATENT DOCUMENTS

| CA | 3048034 A1 * | 7/2018 | ........... G06F 21/552 |
| EP | 3985576 A1 * | 4/2022 | ......... G06F 16/3344 |

(Continued)

OTHER PUBLICATIONS

K. V. Kurmanath, "It's real: Researchers develop Fake-O-Meter to tackle fake news," Businessline, pp. n/a, Nov. 14, 2018 (Year: 2018).*

(Continued)

*Primary Examiner* — Gerardo Araque, Jr.
(74) *Attorney, Agent, or Firm* — Shook, Hardy & Bacon LLP

(57) ABSTRACT

A counterfeit item detection system detects counterfeit items during an item listing processes provided by an online marketplace. The system enhances the ability of the online marketplace to identify and reject potential counterfeit items. The system collects item data in various formats. The item data is analyzed using speech-to-text software and natural language processing to determine data elements representing items, item features, and language context. Questions are generated using the items and item features, and stored for each item. Answers to the questions have associated counterfeit indication weights. The weights are modified and used to rank the questions as feedback is received about counterfeit items. The ranking determines future question selection, allowing the best questions to continually be identified and provided. The counterfeit item detection system also trains a neural network to detect counterfeit items in images, where the training images are obtained from videos related to the item.

20 Claims, 9 Drawing Sheets

(56) References Cited

U.S. PATENT DOCUMENTS

| | | | |
|---|---|---|---|
| 11,347,946 B2* | 5/2022 | Galitsky | G06F 40/216 |
| 11,356,479 B2* | 6/2022 | Prakash | H04L 63/1483 |
| 11,368,420 B1* | 6/2022 | Crook | G06N 20/00 |
| 11,373,752 B2* | 6/2022 | Kendall | G06Q 10/105 |
| 2007/0179978 A1 | 8/2007 | Lee et al. | |
| 2012/0095866 A1 | 4/2012 | Caiazzi et al. | |
| 2013/0124359 A1* | 5/2013 | Hedges | G06Q 30/0601 |
| | | | 705/26.3 |
| 2013/0240630 A1 | 9/2013 | Hood | |
| 2014/0032378 A1* | 1/2014 | Damnjanovic | G06Q 30/0623 |
| | | | 705/28 |
| 2014/0129288 A1 | 5/2014 | Eager et al. | |
| 2014/0143090 A1 | 5/2014 | Deyle et al. | |
| 2015/0269593 A1* | 9/2015 | Le | G06Q 10/087 |
| | | | 705/2 |
| 2015/0339356 A1* | 11/2015 | Myslinski | G06F 16/951 |
| | | | 707/728 |
| 2016/0055490 A1* | 2/2016 | Keren | G06F 16/951 |
| | | | 705/14.47 |
| 2018/0089412 A1* | 3/2018 | Kopikare | G06F 40/174 |
| 2020/0134258 A1* | 4/2020 | Kopikare | G06V 40/161 |
| 2021/0073371 A1* | 3/2021 | Semichev | G06N 20/20 |
| 2021/0295243 A1* | 9/2021 | Tang | G06Q 30/0208 |
| 2022/0084151 A1* | 3/2022 | Tripathi | G06Q 50/01 |

FOREIGN PATENT DOCUMENTS

| | | | | |
|---|---|---|---|---|
| JP | 2003316925 A5 * | 6/2005 | | G06F 16/93 |
| KR | 102364400 B1 * | 2/2022 | | G06F 17/60 |
| WO | WO-2014167516 A1 * | 10/2014 | | G06F 16/24578 |

OTHER PUBLICATIONS

Y. Zhong et al., "Authentication of packeted cigarettes based on computer vision and machine learning," Tobacco Science & Technology, vol. 53, (5), pp. 83-92, May 2020 (Year: 2020).*

Facebook, "Good Questions, Real Answers: Protecting Brands Against Counterfeits", Retrieved from <URL: https://www.facebook.com/business/news/good-questions-real-answers-how-facebook-helps-brands-protect-against-counterfeits>>, Nov. 21, 2019, 6 Pages.

International Search report received for PCT Patent Application No. PCT/US2021/040658, dated Oct. 27, 2021, 3 Pages.

Written Opinion received for PCT Patent Application No. PCT/US2021/040658, dated Oct. 27, 2021, 4 Pages.

Heilman, "Automatic Factual Question Generation from Text", Diss. Carnegie Mellon University, 2011, 203 Pages.

* cited by examiner

COUNTERFEIT ITEM DETECTION SYSTEM

BACKGROUND

Detection of counterfeit items can be challenging. As new methods for detecting counterfeits are employed, counterfeit items are changed to avoid detection by these methods. The result is an ever-evolving pursuit to construct new methods that successfully detect counterfeits.

It is advantageous to detect counterfeits prior to a counterfeit item entering the market. Detection at this time helps to protect downstream consumers that may intentionally or unintentionally acquire the counterfeit item.

SUMMARY

At a high level, aspects described herein relate to detecting counterfeit items provided via a network, such as the Internet. To do so, a counterfeit item detection system collects item data related to an item from various sources, including crawling the network. Depending on the type of item data (video, audio, textual data, and so forth), speech-to-text software or natural language processing is applied. Using these processes, textual elements representing items, item features, or a language context of the item data are identified.

Questions are generated using the item and item features based on a set of language rules. In some aspects, questions are generated when the language context relates to detecting counterfeit items. Some questions may include a request for an image of an item or item feature. The questions are stored as a set of questions, where the set of questions is associated with the item.

The counterfeit item detection system provides a selection of the questions to a client device in response to an item listing request that is received from the client device. The item listing request is a request to provide the item via the network, for instance, through an online marketplace or other online platform. The selection of questions is based on a ranking of the set of questions, where the ranking is done using counterfeit indication weights associated with answers to the questions, which indicate a strength of correlation between the answer and whether the item is likely to be counterfeit. In some aspects, the questions are provided sequentially using a chatbot.

Answers are received for the selection of questions. Based on the answers, the counterfeit item detection system makes a determination whether the item is a counterfeit item. This can be done using a probability value of the combined counterfeit indication weights for the answers or by employing a trained neural network to analyze the received image. Upon determining that the item is a counterfeit item, the item listing request is rejected. In some aspects, the set of questions is re-ranked based on the determination or an indication that the item is counterfeit. The image of the item received during the item listing process (also called an item listing image) may be used to further train the neural network.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
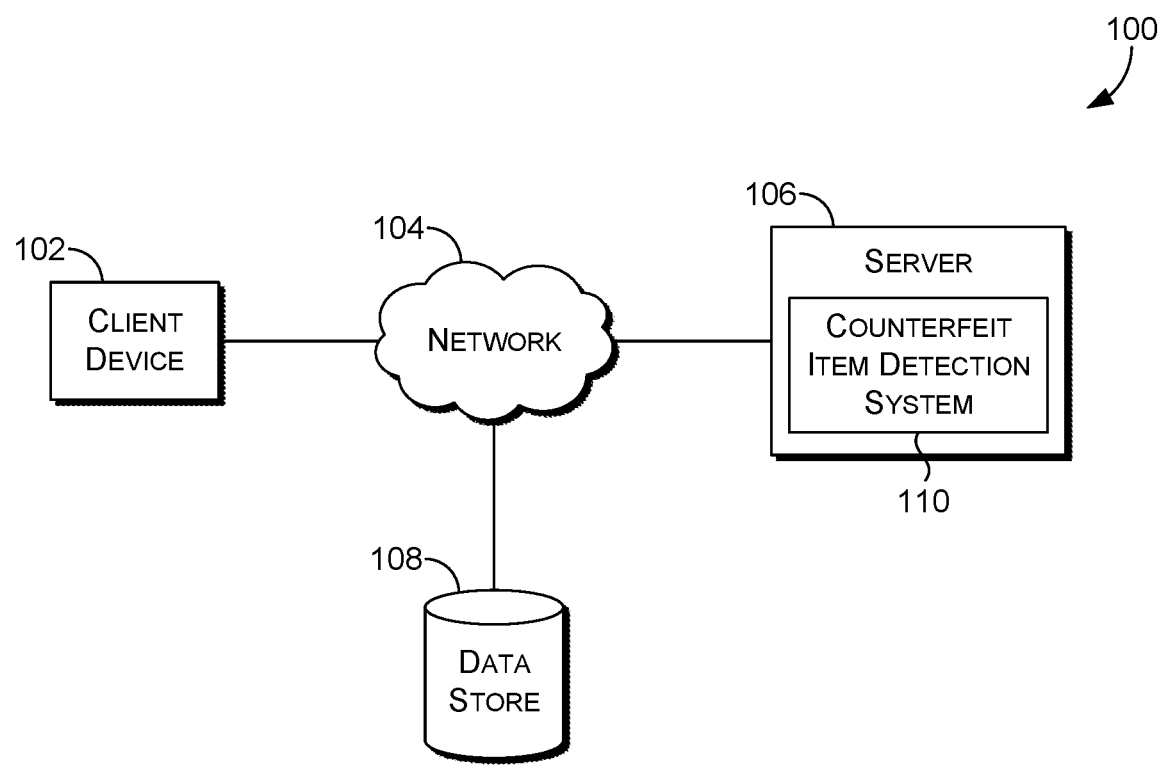
FIG. 1 is a block diagram of an example operating environment suitable for employing a counterfeit item detection system, in accordance with an aspect described herein.

Detecting counterfeit items provides particular challenges when the items are sold online. Conventional methods of inspecting individual items are generally not available because of the absence of a physical marketplace. Some online retailers can protect against inadvertently providing counterfeit items because they can establish long-term relationships with consistent suppliers. Typically, as part of these relationships, the retailer is provided items that it can inspect to insure that the items are genuine.

Online marketplaces, however, do not have the same benefits that many online retailers do. Online marketplaces facilitate exchange by offering a platform where third-party sellers can offer goods and services to consumers. While in many cases the online marketplace is not the actual seller, some online marketplaces still actively seek to detect and remove counterfeit items. By doing so, the online marketplace can provide consumers with a better experience.

One of the challenges for online marketplaces trying to detect counterfeit items is that the online marketplace, in most situations, cannot physically inspect an item. This is because the third-party seller coordinates delivery of the item directly to the consumer after the purchase is made. As such, conventional methods of physically inspecting the items are not available. Thus, certain characteristics of item features that would indicate whether the item is a counterfeit item cannot be physically inspected.

Historically, some online retailers would require a third-party seller to provide a description of the item. The description would generally include certain structured information that would assist in determining whether the item was counterfeit. These descriptors included information such as images of the item, lot numbers, manufacturing dates, serial numbers, ISBNs (international standard book numbers), UPCs (universal product codes), and size and weight information, among many other item descriptors. The online marketplace would determine that an item was counterfeit when the descriptors did not match stored structured data for the item.

This method, however, is not always effective in an online environment, including online marketplaces. One problem is that third-party sellers seeking to intentionally distribute counterfeit items can manipulate this information. Many of these sellers distribute large numbers of the same item. In such cases, the seller can use a description or photo of a genuine item when uploading a description onto the online marketplace. Even third-party sellers making a one-time sale of an item might download stock photos and descriptions from other websites in an attempt to mask the item being counterfeit. This limits the opportunity for the consumer to "virtually" inspect the item. In such cases, the consumer may only become aware that the item is counterfeit after receiving the item.

Another problem specific to online marketplaces results from the large scale of third-party sellers and items being offered. Within online marketplaces, new sellers and new items become available on a continuous basis. Conventional methods of inspecting items generally do not work to identify counterfeit items until a large number of items is offered. Other conventional methods of comparing item descriptors have reduced efficacy when structured data used for comparison is limited or unavailable, which is often the case with many items, and with new items in particular. By the time some of these conventional methods become effective, it is possible that many of the counterfeit items have already been distributed downstream.

As such, it is a goal of some online marketplaces to detect and remove counterfeit items prior to the item being distributed by the third-party seller. In addition, it is beneficial to provide a system that rapidly responds to changes in the online marketplace, such as new third-party sellers and new items that are continuously introduced.

The technology described by this disclosure achieves these goals and provides a solution to the problems specific to online marketplaces. In particular, the present disclosure generally describes a system for detecting counterfeit items by generating questions from various data sources, including unstructured data, related to an item. The questions are then provided when the item is being listed at online marketplace. As counterfeit items are identified, the questions are continuously being ranked so that the questions more likely to identify counterfeit items are identified and provided as items are listed.

Using this method, questions that help identify counterfeit items are rapidly identified and provided when third-party sellers list items. The ranking of the questions as new counterfeit items are identified allows the system to begin identifying counterfeit items for new items that are offered on the online marketplace. This helps solve problems of scale and the constant change of items that results from the online marketplace. Further, the generation of the questions can be done using unstructured data. Thus, in addition to identifying questions that are highly correlated to identifying counterfeit items, the system generates questions that are not easy, and in some cases, impossible, to look up online. Thus, the third-party seller that is intentionally seeking to skirt the system by identifying answers indicative of a genuine item is in most cases unable to do so, as the answers are not readily available. Moreover, the types of questions that are generated by the system and provided during an item listing process are highly correlated to identifying counterfeit items within an online environment. Thus, the technology is suitable for identifying counterfeit items specifically within the online environment, including online marketplaces and other types of online retail platforms, and in general, it is more effective at identifying counterfeit items than those conventional methods previously described.

One specific example method that can be employed using the described technology to attain these goals and achieve these benefits over conventional methods begins by identifying item data. Item data is identified and collected from structured data specifically describing the item using item descriptors or unstructured data associated with the item that discusses the item within some general context. The item data is analyzed based on the type of item data that is collected. For unstructured data, a natural language processing model can be employed to determine the language and the context in which the language is used. For instance, configurations may use various natural language processing models, such as BERT (Bidirectional Encoder Representations from Transformers), generative pre-trained transformer (GPT)-2 and -3, and/or other natural language processing models.

From the item data, the natural language processing model identifies an item and item features that are associated with the item. Questions are then generated using the item features based on a set of grammatical language rules. In addition, the natural language processing model determines the context in which the item and item features are being used. Where the context is known, questions can be generated from item features when the context relates to counterfeit items. Sometimes, this provides an increased probability that the questions will ultimately correlate to identifying counterfeit items.

Put in terms of an example use case, unstructured data in the form of an online forum discussion is obtained using a web crawler. The textual data of the forum is processed using the natural language processing model. The natural language processing model identifies a specific model of a name brand shoe as the item. It further identifies discussion of a name brand logo located on an inside tongue area and a double welt seam used along the collar, each of which is an item feature. In some cases, the forum discussion could be in the context of identifying counterfeit items. Questions are then generated by applying grammatical language rules to the item features. Here, a question could be, "Does the name brand item have a name brand logo located inside of the tongue?" Another question could be, "What type of stitching is used along the collar of the name brand shoe?" In cases where the natural language processing model determines the language context, the questions may be generated upon determining that the language context relates to counterfeit items.

Once generated, the questions are stored in association with the item. The group of one or more questions generated for the item is stored as a set of questions for the item. In this example, each item can have an associated set of questions specific to that item. As item features are identified for the item, more questions can be added to the set of questions. And thus, over time, the set of questions is built for each item. Each question of the set of questions can also have an associated set of counterfeit indication weights. These are values that indicate how strongly correlated the question is with identifying a counterfeit item. That is, a question with a relatively strong correlation to identifying counterfeit items would be more likely to identify a counterfeit item based on the answer to the question. Each question can have one or more associated counterfeit indication weights, each counterfeit indication weight being specific to a possible answer to the question. The set of questions and the counterfeit indication weights can be indexed within a datastore for later recall.

In order to detect counterfeit items, questions can be provided to a third-party seller when the seller uploads an item to the online marketplace. When a third-party seller attempts to place an item on the online marketplace, the third-party seller sends an item listing request to the online marketplace. The item listing request identifies the item to be listed. The item listing request can initiate an item listing process for the item provided by the online marketplace.

As part of the item listing process, the system retrieves a selection of questions from the datastore using the provided item identification. The selection of questions may be all or a portion of the set of questions associated with the item. The selection of questions is selected from the set of questions using the counterfeit indication weights. One method of selection ranks the set of questions using the counterfeit indication weights, having the highest ranking questions being those more strongly correlated to identifying counterfeit items. The selection of questions is determined by selecting a number of highest ranked questions. The selection of questions may further include a newly generated question or random questions selected from outside of the highest ranked questions. This may be done to constantly identify other questions that are highly correlated to identifying counterfeit items and that are not currently included among the highest ranked questions. The selection of questions is then provided to the client device, such as that of a third-party seller, as part of the item listing process.

Answers to the selection of questions are received by the system from the client device by the third-party seller. A determination is then made whether the item is likely to be a counterfeit item based on the answers. One method includes determining a probability value using the counterfeit indication weights of the selection of questions as determined by the answers. The probability value can be the total weighted value of the answers to the questions as a function of the counterfeit indication weights. As an example, the probability value can be determined by identifying the counterfeit indication weights associated with each answer to the questions and calculating the joint probability of these counterfeit indication weights by using a multivariate probability function. A counterfeit indication threshold value can be predefined, such that a relatively higher threshold requires a relatively higher joint probability to determine that the item is counterfeit. The joint probability is compared to the counterfeit indication threshold, and the determination is made that the item is counterfeit when the joint probability exceeds the threshold. It should be understood that taking a linear combination of the weights and probability is only one example approach and other approaches can be employed. For instance, determination that an item is counterfeit could also be achieved using a more complex function, including a neural network trained for this specific purpose on historical data.

Upon determining that an item is likely to be counterfeit, the system will reject the item listing request. That is, the system can prohibit the item from being offered to consumers via the online marketplace or other platform. In another aspect, a value or other indicator evidencing a likelihood of the item being counterfeit (e.g., by examining the seller provided answers and/or images) is provided by the online marketplace to the consumer when the consumer is viewing the item to make a purchase decision. In this way, the consumer can make the decision whether to purchase the item based on the likelihood that the item might be counterfeit as projected by the value.

As noted, the system can continuously change the selection of questions to provide questions that are most likely to identify a counterfeit item, and to adapt to new items or changing item features. In doing so, the system receives an indication that an item is counterfeit. This can be received from the consumer, a third-party seller, or any other entity. The online marketplace may also receive items and determine whether the items are counterfeit by performing a physical inspection, thus receiving an indication the item is counterfeit.

Counterfeit indication weights used to indicate a strength of correlation between questions/answers and whether an item is counterfeit can be adjusted, such as after each confirmation of an item being genuine (positive reinforcement) or counterfeit (negative), at certain time intervals, and/or after a specific number of items have been processed. For instance, upon receiving the indication that the item is counterfeit, the questions and answers provided and received as part of the transfer of the item through the online marketplace can be retrieved. Where the item is counterfeit, the counterfeit indication weights of the previous answers are adjusted to show a relatively stronger correlation indicative of an item being counterfeit. In this way, questions that previously indicated counterfeit items have adjusted counterfeit indication weights that show a stronger correlation. New questions and any random questions provided as part of the selection also receive adjusted counterfeit indication weights. In the same sense, where an item is determined to be genuine, then the counterfeit indication weights can be adjusted to show less of a correlation to determining whether the item is counterfeit. Once adjusted, the set of questions can be ranked or re-ranked. Subsequent selections of questions are selected from the new ranked or re-ranked set of questions in response to new item listing requests. Alternatively, a machine learning algorithm could be used decide if an item is counterfeit, taking as input the item and the set of questions and outputting a probability of being counterfeit. This model could be trained using historical data. If a neural network is used, the "weight" of each rule would be a parameter of the network and the training process would adjust these weights to maximize its accuracy on some test set.

Another aspect of the present disclosure provides for a system of automatically training and using a machine learning model to detect counterfeit items using images. One question provided within a set of questions might include a request for an image of the item or part of the item (e.g., a particular item feature). Images of the item provided as part of the item listing process are denoted item listing images. Using the item listing image, the trained machine learned model detects item features of the item and makes a determination whether the item is counterfeit based on a probability value determined by the trained machine learned model.

To train the machine learning model, the system can begin by collecting videos related to an item. The videos might be received from sources that indicate the video is related to the item or may be obtained by crawling the web to identify videos that relate to the item. Having received videos related to the item, a speech-to-text function, such as Microsoft's Azure Speech to Text, can be employed to convert the audio information within the video to textual data.

The natural language processing model can be employed on the textual data to identify an item, item features, or a language context. When the natural language processing model identifies an item feature and identifies the language context as related to identifying counterfeit items, an image can be obtained from the video. The image can be obtained by taking a snapshot of a video frame. The snapshot is obtained at a time of the video that coincides with the textual data indicating the item features and the language context. In this way, there is a probability that the image contains an item feature that is indicative of a counterfeit item.

The image obtained from the video can then be included within a training data set and stored on a datastore. Other images that may be included within the training data set comprise images provided as answers in response to previous questions. The training data set may as well include images of known counterfeit items.

The training data set having the image obtained from the video is used to train the machine learning model to provide a trained machine learned model. A convolutional neural network can be used as the machine learning model. Once trained, the machine learning model can identify counterfeit items from images.

In one example, the system provides a selection of questions to a third-party seller during an item listing process. One of the questions includes a request for an image of the item. The request may further include a request for a specific item feature of the item. Upon receiving the image, the system may optionally first determine whether the image has been retrieved from the Internet or another network by performing a reverse image search. This can be done to help ensure that the third-party seller is providing an image of the actual item that is being uploaded. If the same image is not found during the reverse image search, the image is provided as in input to the trained machine learned model. The trained machine learned model outputs a determination of whether the item is counterfeit based on the image of the item feature and a likelihood that the item feature is indicative of a counterfeit item.

Having provided some example scenarios, a technology suitable for performing these examples is described in more detail with reference to the drawings. It will be understood that additional systems and methods for detecting counterfeit items can be derived from the following description of the technology.

Turning now to FIG. 1, FIG. 1 illustrates a block diagram of example operating environment 100 in which implementations of the present disclosure may be employed. In particular, FIG. 1 illustrates a high-level architecture of operating environment 100 having components in accordance with implementations of the present disclosure. The components and architecture of FIG. 1 are intended as examples, as noted toward the end of the Detailed Description.

Among other components or engines not shown, operating environment 100 includes client device 102. Client device 102 is shown communicating using network 104 to server 106 and datastore 108. Server 106 is illustrated as hosting aspects of counterfeit item detection system 110.

Client device 102 may be any type of computing device. One such example is computing device 900 described with reference to FIG. 9. Broadly, however, client device 102 can include computer-readable media storing computer-executable instructions executed by at least one computer processor.

Client device 102 may be operated by any person or entity that interacts with server 106 to employ aspects of counterfeit item detection system 110. Some example devices suitable for use as client device 102 include a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

Client device 102 can employ computer-executable instructions of an application, which can be hosted in part or in whole at client device 102, or remote from client device 102. That is, the instructions can be embodied on one or more applications. An application is generally capable of facilitating the exchange of information between components of operating environment 100. The application may be embodied as a web application that runs in a web browser. This may be hosted at least partially on a server-side of operating environment 100. The application can comprise a dedicated application, such as an application having analytics functionality. In some cases, the application is integrated into the operating system (e.g., as a service or program). It is contemplated that "application" be interpreted broadly.

As illustrated, components or engines of operating environment 100, including client device 102, may communicate using network 104. Network 104 can include one or more networks (e.g., public network or virtual private network "VPN") as shown with network 104. Network 104 may include, without limitation, one or more local area networks (LANs) wide area networks (WANs), or any other communication network or method.

Server 106 generally supports counterfeit item detection system 110. Server 106 includes one or more processors, and one or more computer-readable media. One example suitable for use is provided by aspects of computing device 900 of FIG. 9. The computer-readable media includes computer-executable instructions executable by the one or more processors. The instructions may optionally implement one or more components of counterfeit item detection system 110, which will be described in additional detail below with reference to FIG. 2. As with other components of FIG. 1, while server 106 is illustrated a single server, it can include one or more servers, and various components of server 106 can be locally integrated within the one or more servers or may be distributed in nature.

Operating environment 100 is shown having datastore 108. Datastore 108 generally stores information including data, computer instructions (e.g., software program instructions, routines, or services), or models used in embodiments of the described technologies. Although depicted as a single component, datastore 108 may be embodied as one or more datastores or may be in the cloud. One example of datastore 108 includes memory 912 of FIG. 9.

Having identified various components of operating environment 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are intended as examples in nature and in number and are not to be construed as limiting for all implementations of the present disclosure. Other arrangements and elements (e.g., machines, interfaces, functions, orders, and groupings of functions, etc.) can be used in addition to or instead of those shown, and some elements may be omitted altogether.

Figure 2:
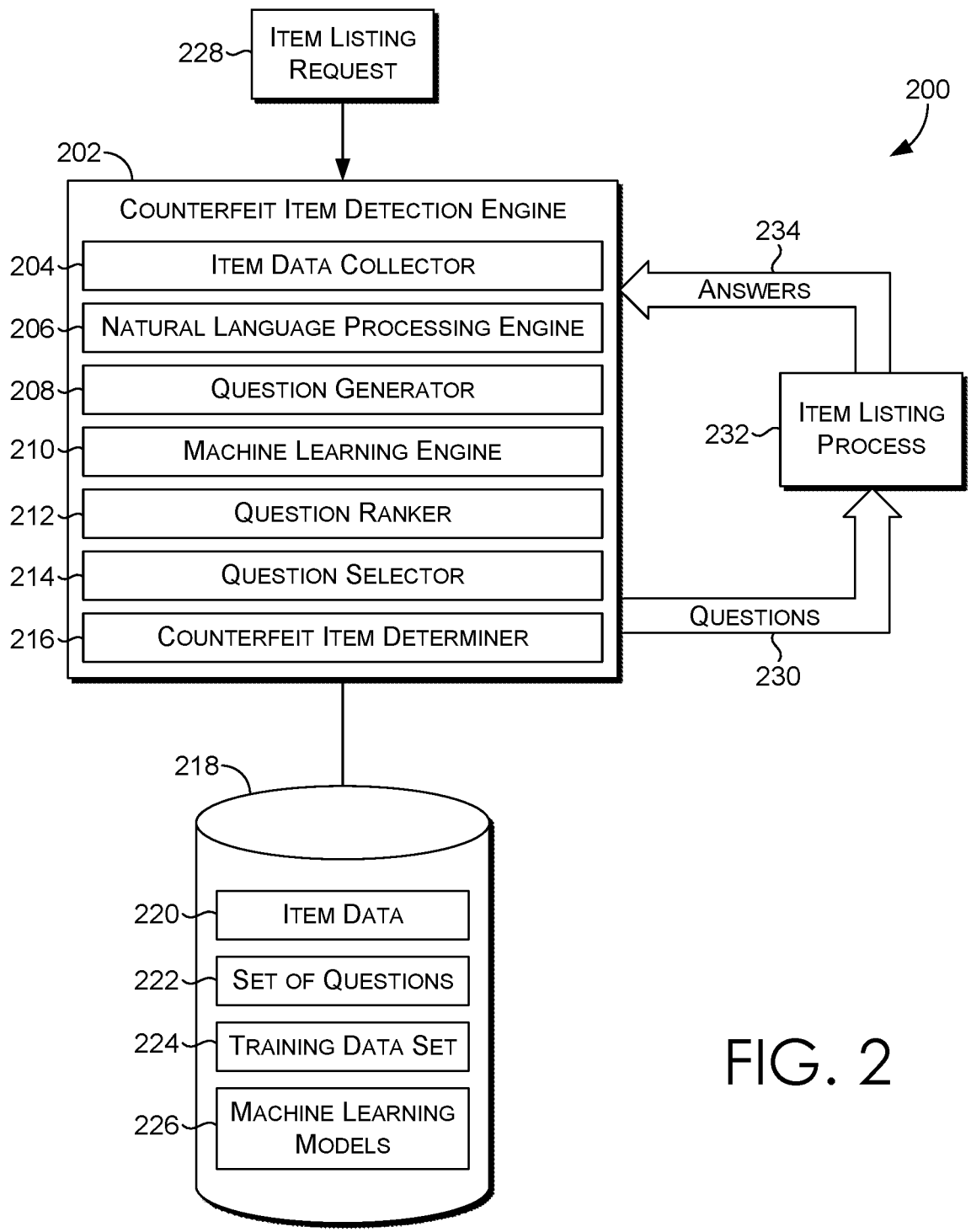
FIG. 2 is a block diagram of an example counterfeit item detection system, in accordance with an aspect described herein.

With regard to FIG. 2, an example counterfeit item detection system 200 is provided. Counterfeit item detection system 200 is suitable for use as counterfeit item detection system 110 of FIG. 1. Many of the elements described in relation to FIG. 2 are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory.

As illustrated in FIG. 2, counterfeit item detection system 200 includes counterfeit item detection engine 202. Counterfeit item detection engine 202 generally generates and provides questions for detecting counterfeit items, and determines whether an item is likely to be a counterfeit item based on answers to the questions. To do so, counterfeit item detection engine 202 employs item data collector 204, natural language processing engine 206, question generator 208, machine learning engine 210, question ranker 212, question selector 214, and counterfeit item determiner 216.

As illustrated, counterfeit item detection engine 202 communicates with datastore 218. Datastore 218 is the type of datastore described with respect to datastore 108 of FIG. 1. Datastore 218 is illustrated as including item data 220, set of questions 222, training data set 224, and machine learning models 226. The data illustrated within datastore 218 is illustrated as an example. More or less data elements, or combinations of data elements used by counterfeit item detection engine 202 may be provided. The data elements shown in FIG. 2 have been provided to describe one example that can be implemented using the described technology.

Item data collector 204 is generally configured to collect data related to items. Item data collector 204 collects various types of data related to items, including structured data and unstructured data. Structured data includes data that is organized in some scheme that allows the data to be easily exported and indexed as item data 220 with minimal processing. Structured data can generally be collected and rearranged to comport to the index of item data within item data 220. Unstructured data is anything other than structured data. It relates to an item and generally discusses the item within context. However, unstructured data generally requires additional processing in order to store it in a computer-useable format within item data 220.

Item data collector 204 can apply a web crawler to identify and obtain structured and unstructured data on the Internet or another network. For structured data, item data collector 204 arranges and stores the collected structured data within item data 220. Unstructured data can be further processed by other components of counterfeit item detection engine 202, as will be described. Item data collector 204 may collect item data related to an item by receiving structured or unstructured data from any other source. Item data may be received from any entity, including third-party sellers, consumers, online marketplaces, manufacturers, retailers, collectors, item experts, websites, and governments, among many other sources. Both structured and unstructured item data can include online conversations, stored chatbot information, manufactures' specifications, item inspection notes, expert opinions, item packaging, general communications, books, articles, presentations, or any other medium through which information is conveyed. Item data can be in the form of audio, images, video, text, machine language, latent information, and the like. Item data collector 204 collects the item data by obtaining or receiving it, and stores the collected item data as item data 220 in datastore 218.

Natural language processing engine 206 is generally configured to process item data 220 to identify or extract information. Natural language processing engine 206 may receive collected item data from item data collector 204, process the item data as needed, and store the processed item data as item data 220 in datastore 218. Natural language processing engine 206 can be applied to process structured or unstructured data.

To process item data 220, natural language processing engine 206 is generally applied to textual data within item data 220. For audio and video data, a speech-to-text software can be employed to convert audio and video data into textual data for further processing by natural language processing engine 206. One example of a speech-to-text software that is suitable for use with the current technology is Microsoft's Azure Speech to Text. Other speech-to-text software may also be suitable for use.

Natural language processing engine 206 employs the natural language processing model to process item data 220. One example natural language processing model that can be employed by natural language processing engine 206 is BERT. In some cases, BERT can be pretrained using any online data sources, such as those provided by Wikipedia and BooksCorpus. A pretrained BERT model can also be obtained and the BERT model can be fine-tuned using a corpus of textual information that describes items. In some cases, the textual information within the corpus used for fine-tuning can be labeled to indicate items and item features, and be labeled to indicate words or phrases that relate to a specific language context, such as a language context related to counterfeit items. It will be understood that other natural language processing models may be used, including one or more models for identifying items, item features, language context, and their associations, and such models are intended to be within the scope of the natural language processing models described herein.

Once trained, natural language processing engine 206 can process item data 220 to identify textual elements and context from the textual data of item data 220. Item data 220 is provided as an input to the trained natural language processing model of natural language processing engine 206. The output provided by the trained natural language processing model includes an indication of textual elements within item data 220. The textual elements may include textual data describing items and item features, and may include an association between an item feature and an item. For example, within a document containing a description of a name brand shoe, the text within the document representing the name brand shoe is identified and can be associated with metadata or indexed to indicate that the text represents the name brand shoe. Likewise, text representing item features, such as the model, size, color, manufacturing dates and numbers, logo locations, logo size, item tag locations, text printed on the item's tag, material composition, weight, and so forth are also identified and are associated with metadata or indexed to indicate that the text represents the item features. Moreover, the item features can be associated with the item. That is, an item feature can be identified as associated with the item based on the context of the textual data. Text representing the item features can be associated with metadata or index to indicate the relationship to the item, e.g., that the identified item feature is an item feature of the item.

As noted, the trained natural language processing model of natural language processing engine 206 can be employed to identify a language context within the text. The language context of the text identified by the trained natural language processing model may include a language context related to counterfeit items. The language context of the textual data representing the item and item features may be related to detecting counterfeit items. The language context of the textual data can be indicated using metadata. The language context of the textual data can also be indicated within the index of the indexed items and item features.

Question generator 208 is generally configured to generate questions. Question generator 208 can generate questions based on the item and the item features identified by natural language processing engine 206. One or more questions can be generated for each identified item. Questions generated for items are illustrated as stored in datastore 218 as set of questions 222. Set of questions 222 can include one or more sets of questions, each set of questions associated with an item.

Question generator 208 uses a set of language rules to generate questions. The set of language rules comprises one or more language rules for each language associated with the textual data of item data 220. Language rules can be provided by a trained machine learned model that provides questions about the item using the item features. Broadly, a neural network can be trained using general text and questions generated from the text. The neural network can be applied as the language rules to output questions from an input of item data 220. Some trained question generation algorithms suitable for use are known in the art. Michael Heilman describes one example method that can be employed with the current technology, along with a description of historical question generation programs. M. Heilman. 2011. Automatic Factual Question Generation from Text. Ph.D. Dissertation, Carnegie Mellon University. CMU-LTI-11-004, available at http://www.cs.cmu.edu/~ark/mheilman/questions/papers/heilman-question-generation-dissertation-.pdf, which is hereby incorporated by reference in its entirety. Other approaches may be employed within the scope of the technology described herein.

As a general matter, the term "question" is not intended to specifically describe a question in the grammatical sense. A grammatically correct question is only one aspect included within the term "question." The use of "questions" is intended to be broader and include any request for information. Questions can be provided as part of an item listing process that is initiated in response to an item listing request by a third-party seller. The questions included within set of questions 222 and generated by question generator 208 can include a broad range of information requests and formats, including a request for descriptive information about an item or item feature. That is, where an item feature is further described within item data 220, and its descriptors are identified by natural language processing engine 206, the question can be generated to request the descriptors of the item feature. Another type of question generated by question generator 208 and stored within set of questions 222 includes a request for an item listing image from the third-party seller, including an image of the item or item feature. Thus, where an item or item feature is identified in item data 220, a question can be generated by question generator 208 to request an image of the item or item feature.

Machine learning engine 210 is generally configured to train machine learning models utilized by aspects of counterfeit item detection engine 202. As previously described, a natural language processing model, such as BERT, can be trained and employed by counterfeit item detection engine 202. Machine learning engine 210 can pre-train or fine tune the natural language processing model to output a trained machine learned model. Various pre-trained natural language processing models are available. However, a natural language processing model can generally be trained or pre-trained on a large corpus of text, such as that provided by Wikipedia. Machine learning engine 210 can use a more specific data set type to fine tune pre-trained models. The specific data set can be included as part of training data set 224 within datastore 218. This may include various text that has been labeled to indicate text that represents items and item features. Labeled associations can be included to indicate the association between the item and the item features within the text. Additional labels can be added to indicate words describing aspects of the item feature, such as location, size, and so forth. For example, text representing a name brand shoe can be labeled as an item, while an item logo can be labeled as an item feature and labeled to show the association of the item feature with the item. Descriptive aspects of the item feature might include a location, such as the inside tongue of the left shoe and the size of the logo at that location, and can be labeled to indicate further description of the item feature. Additionally, known documents that describe detection of counterfeit items can be used to train the natural language processing model to identify context related to detecting counterfeit items. Some of these documents may include expert reports. Such labeled data can be included within training data set 224 for use in training machine learning models employed by counterfeit item detection engine 202. Trained machine learned models are stored in datastore 218 as machine learning models 226 for use by aspects of counterfeit item detection engine 202.

Machine learning engine 210 can also be employed to train a machine learning model that detects counterfeit items from images. A convolutional neural network is one example that can be used as the machine learning model that detects counterfeit items within images. Machine learning engine 210 can use training data set 224 to train the machine learning model. Here, training data set 224 includes training images of known counterfeit items or items likely to be counterfeit. The training images of the items can include item features of the item. The training images can be obtained from video related to the item, identified from images online that include a description of the item as being counterfeit, provided from images taken during an inspection of a known counterfeit item, received from a consumer, received from a third-party seller as an item listing image, retrieved from a government data base cataloging known counterfeit items, and the like.

In one aspect, the training images are determined from images or video identified by item data collector 204. Images obtained by item data collector 204 can be processed to determine whether the image includes text or metadata that indicates whether the image includes a counterfeit item. This can be done using natural language processing engine 206. Where the image is determined to be associated with a context of determining counterfeit items, the image can be provided to training data set 224 as a training image. Training images can include images obtained from a video. Videos identified by item data collector 204 can be processed using natural language processing engine 206, including a speech-to-text function and a trained natural language processing model. The textual data determined from the video is associated with a specific time within the video. By analyzing the textual data to identify items, item features, or context related to determining counterfeit items, the time associated with the text of the textual data representing the items, item features, or context can be identified. An image of the video at this corresponding time in the video can be obtained by taking a snapshot of a video frame.

The image is labeled with the item or item feature, and labeled as relating to counterfeit item detection. The labeled image is then stored as part of training data set 224. The labeled image may be provided to a person for confirmation of the image and label prior to including it within training data set 224, in some cases.

Question ranker 212 is generally configured to rank questions. Question ranker 212 ranks a set of questions to provide a ranked set of questions. Question ranker 212 can rank one or more sets of questions within set of questions 222. Question ranker 212 can rank and re-rank a set of questions as part of ranking the set of questions. Question ranker 212 may rank questions in response to an indication whether an item is counterfeit. This may be done after modifying the counterfeit indication weights. Question ranker 212 may rank questions in response to a rejection of a counterfeit item, as will be discussed.

One method of ranking the questions includes ranking the questions based on counterfeit indication weights. In the context of machine learning, these weights may be referred as probabilities, and a weight representing a probability of the item being counterfeit is associated with each question and answer pair. Each question can have one or more counterfeit indication weights associated with it. Some questions will have multiple answers. Thus, the question can have multiple counterfeit indication weights associated with it, where each counterfeit indication weight is associated with one of the answers. In general, a counterfeit indication weight indicates a strength of the correlation between an answer to a question and whether the item is a counterfeit item. Counterfeit indication weights can be indexed in association with questions stored within set of questions 222.

As will be further described, question ranker 212 adjusts the counterfeit indication weights based on feedback on whether an item is genuine or counterfeit. While various algorithms can be derived that provide values to counterfeit indication weights and modify counterfeit indication weights, one example method is to define counterfeit indication weights based on a scale from −1.00 to 1.00. Here, negative values indicate an indirect correlation between an answer to a question and whether the item is counterfeit. Thus, an answer having a −1.00 correlation would indicate that the item is not counterfeit. As values increase from −1.00 to 0, the counterfeit indication weights still indicate an indirect correlation and that the item is not likely to be counterfeit; however, the higher values (as 0 is approached) are a relatively weaker correlation. For instance, a value of −0.75 is a relatively stronger inverse indicator than a greater value of −0.25. On this scale, 0 would then represent no correlation between the answer and whether the item is a counterfeit item. Conversely, a value of 1.00 would indicate that the item is counterfeit. Thus, positive values on this scale would indicate a direct correlation of whether the item is counterfeit. As values decrease from 1.00 to 0, the values still indicate a direct correlation and that the item is likely to be counterfeit. However, the correlation decreases in strength as the values decrease. For instance, a value of 0.75 is a relatively stronger direct indicator that the item is a counterfeit item than a value of 0.25. Again, it should be understood that this is only one method to define counterfeit indication weights using one example scale. Others can be defined and used. It is intended that the described method be one example suitable for use. However, it is also intended that other methods be included within the scope of this disclosure as counterfeit indication weights. For instance, some configurations may employ a neural network to identify counterfeit items, and the update rule used in the neural network (back propagation algorithm) would include updating weights (decreased) when the model makes incorrect predictions.

Questions ranker 212 modifies the counterfeit indication weights based on feedback that includes whether an item is authentic or counterfeit. This feedback may be received from any source, including consumers, an online marketplace, retailers, experts, government officials, manufacturers, and third-party sellers, among others. When feedback is received about an item, previous answers to the questions related to the item can be identified and the counterfeit indication weights associated with the answers to the questions can be adjusted based on the indication.

In the example method described, when an item is determined to be counterfeit, question ranker 212 increases the counterfeit indication weights associated with the answers. If the feedback indicates the item is genuine, then question ranker 212 decreases the counterfeit indication weights associated with the answers. The amount of the increase or decrease may be based on the total feedback received for the item, including one or more feedbacks that the item is counterfeit or genuine.

One mechanism for determining the value of the increase or decrease of the counterfeit indication weights suitable for use with the described example method involves assigning a −1.00 to an answer when the item is identified as genuine and a 1.00 to the answer when the item is identified as counterfeit. Each assigned value for the answer across all feedback received for the item is averaged, and this average provides the counterfeit indication weight.

As an example, during an item listing process, a third-party seller provides an answer to a question. If the item is determined to be counterfeit, then that answer is assigned a value of 1.00. If another seller provides the same answer to the same question during an item listing process of the same item, then the answer is provided a second value of 1.00 if the item is determined to be counterfeit. If a third seller provides the same answer to the same question, but the item is determined to be genuine, then the answer is assigned a third value of −1.00. Averaging these values yields 0.33, which is the counterfeit indication weight associated with the answer to the question according to this example method.

Question ranker 212 can rank the set of questions based on the counterfeit indication weights. In the example method being described, counterfeit indication weights having a greater value are ranked higher because they are more strongly correlated to determining whether an item is counterfeit. Thus, the questions associated with answers having counterfeit indication weights are ranked higher when there is a greater value for the counterfeit indication weight. The absolute value of the counterfeit indication weights may be determined before the ranking. That is because values approaching −1.00 also strongly indicate whether an item is counterfeit, however, in an inverse manner. In this way, questions having answers strongly correlated to indicating whether an item is counterfeit are ranked higher.

Question selector 214 is generally configured to select questions from a set of questions for an item. Question selector 214 may select questions from a ranked set of questions ranked by question ranker 212. Questions selected by question selector 214 are provided as a selection of questions.

In general, any number of questions can be selected by question selector 214 and provided to a third-party seller as part of an item listing process and in response to an item listing request. The number provided can be a pre-configured number. While, again, any number can be selected, one pre-configured number example is 10 questions selected as part of a selection of questions selected from the set of questions for an item.

Question selector 214 can be configured to select only a top ranked number of questions from the set of questions. Question selector can also be configured to select new or lower ranking questions to be included within the set of questions. In this way, new questions can be introduced so that their counterfeit indication weights may be established and begin to be adjusted by question ranker 212. Other questions having counterfeit indication weights lower than the top ranked counterfeit indication weights may be selected at random and included within the selection of questions. This allows constant adjustment of the counterfeit indication weights for all of the questions within the set of questions for an item. This also helps to eliminate any bias toward top ranking questions. In an aspect, questions within the set of questions that do not strongly correlate to determining whether an item is counterfeit, as determined by a low correlations threshold, for example, can be removed from the set of questions by question ranker 212. This allows the processing of sets of questions to not require a continual increase in computer processing power as the system continually adds new questions.

Counterfeit item determiner 216 is generally configured to determine whether an item is counterfeit. One method includes counterfeit item determiner 216 receiving item listing request 228. Item listing request 228 may be received from a third-party seller seeking to provide an item using an online marketplace, and may be provided from a client device. Counterfeit item determiner 216 provides questions 230 selected by question selector 214 as part of item listing process 232. Counterfeit item determiner 216 then receives answers 234 to questions 230 from the third-party seller. Answers 234 may be provided in any form, including an item listing image, video, textual data, acknowledgements of information (e.g., radio buttons, checkboxes, etc.), and the like. Questions 230 may also be provided in any form, including images, video, textual data, including open-ended and closed-ended requests for information, and the like.

In some contexts, it may be beneficial to offer the questions using a chatbot. This functionality allows one question to be asked and answered prior to moving to another question. In such cases, follow-up questions can be asked based on the answer to the prior question. Questions can be continually and sequentially provided until a threshold confidence level (or value) is achieved, as will be discussed, so that a determination can be made as to whether the item is counterfeit.

Upon receiving answers 234, counterfeit item determiner 216 determines whether the item is a counterfeit item, e.g., whether the item is likely to be a counterfeit item to some level of confidence. One method of making this determination is to base the determination on a probability value. The probability value is determined using the counterfeit indication weights associated with answers 234. As will be understood, there can be a plurality of answers within answers 234, and therefore, there can be a plurality of counterfeit indication weights for use in determining the probability value. Other methods of determining whether the item is likely to be counterfeit based on the plurality of counterfeit indication weights associated with answers 234 may be employed. This is just one example method that is suitable for use with this invention. Other methods are intended to be within the scope of this disclosure as it relates to determining whether the item is counterfeit based on answers 234.

One example method of determining the probability value is to determine the total weighted value of answers 234. This can be done by averaging the counterfeit indication weights for answers 234. Using this method, the average value is the probability value. Another method employs higher dimensional analysis functions. Here, the counterfeit indication weights can be applied to a multivariate probability function to determine the joint probability of the counterfeit indication weights. In this method, the joint probability provides the probability value for use by counterfeit item determiner 216 to determine whether the item is a counterfeit item. A further approach would be to view the weights as probability of being counterfeit given the item and the question and answers. Weights could be between 0 and 1, and the neutral weight would be 0.5. Odd ratios could also be used. Further, a machine learning model (e.g. a neural network) to predict the overall counterfeit probability could be employed, making the aggregation function potentially nonlinear.

To make the determination whether the item is likely to be counterfeit, counterfeit item determiner 216 can compare the determined probability value to a counterfeit indication threshold. The use of the counterfeit indication threshold is one technical method for implementing the underlying technology. However, the actual value of the counterfeit indication threshold may be any value, and it may be predetermined based on a decision to balance the percentage of counterfeit items being correctly identified as counterfeit and any false positive error rate that might occur due to misidentification of genuine items as counterfeit. For instance, using the method described in this disclosure, an example counterfeit indication threshold value could be set at 0.95. In this way, counterfeit item determiner 216 would determine that any item having a probability value between 0.95 and 1.00 is a counterfeit item.

The specific value can be determined by identifying known counterfeit items and answering questions provided by counterfeit item determiner 216 for the item. This is can be done, for instance, in machine learning using precision recall curve analysis. Counterfeit item determiner 216 provides the probability value that the item is counterfeit. This process can be done with a group of known items, both counterfeit and genuine. The counterfeit indication threshold value can be set to exclude a specific percentage of counterfeit items compared to the percentage of false positives, e.g., those items having a probability value exceeding the set counterfeit indication threshold but are genuine items.

If counterfeit item determiner 216 determines the item is counterfeit, then counterfeit item determiner 216 can reject the item listing request. This denies the third-party seller's request to place the item on the online marketplace. This method also allows the counterfeit item to be detected and rejected prior to the item being provided to a consumer or further entering the downstream market.

In response to determining that the item is a counterfeit item, counterfeit item determiner 216 may provide an indication that a counterfeit item has been detected to question ranker 212. As noted above, question ranker 212 may rank or re-rank a set of questions associated with the item based on the indication that the item is a counterfeit item.

As will be recognized, counterfeit item detection engine 202 utilizes counterfeit item determiner 216 throughout multiple item listing processes and across various items listed on an online marketplace. As such, the feedback gained for a first item listing process for a first item listing request can be used in a second item listing process for a second item listing request, which may both be used in a third item listing process for a third item listing request, and so forth. In this way, previous answers to a previous selection of questions can be used to determine a ranking of the set of questions, and this ranked set of questions can be used for a current selection of questions.

Figure 3:
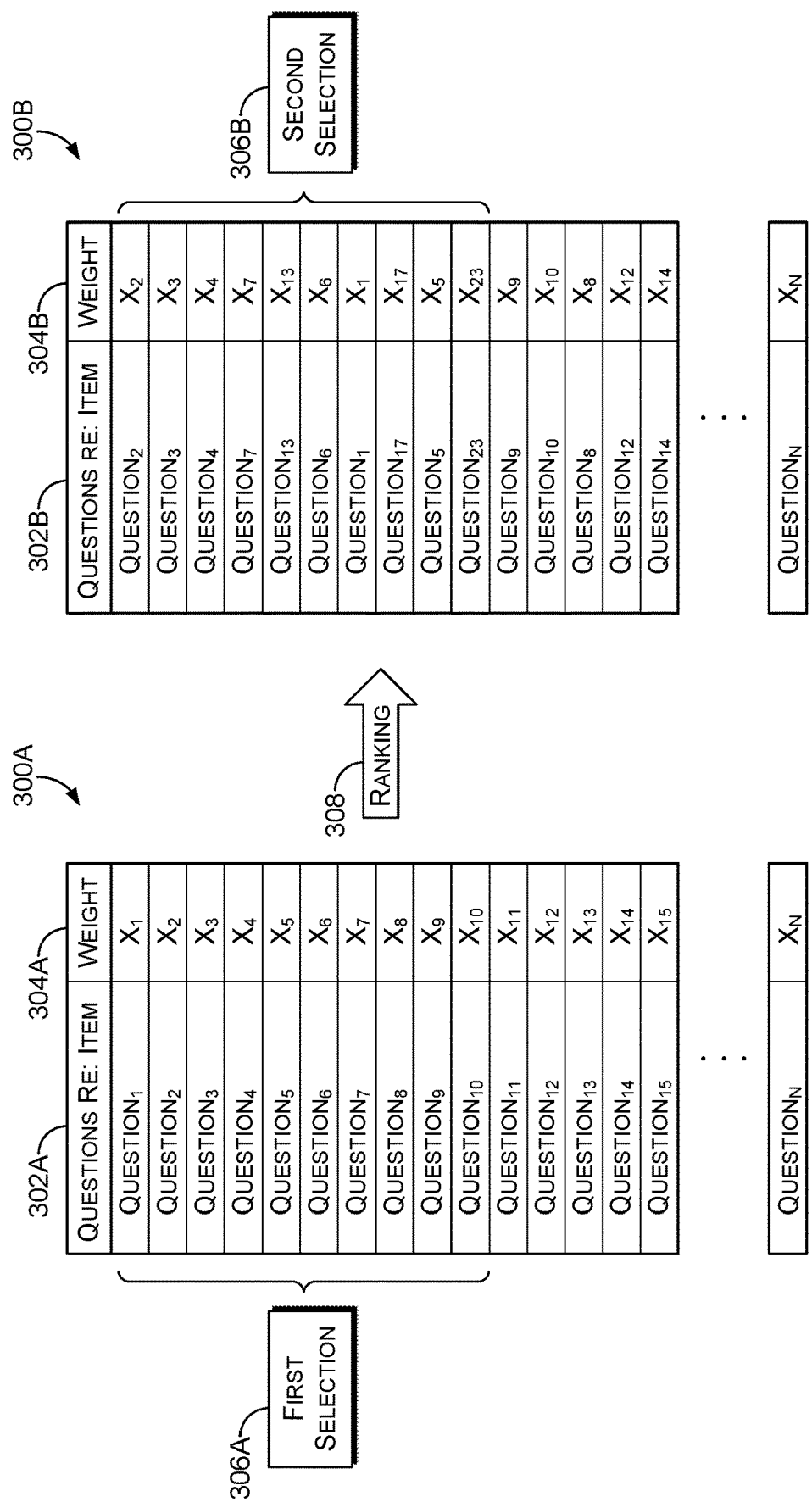
FIG. 3 is an illustration of an example ranking and selection of questions in an index using the counterfeit item detection system of FIG. 2, in accordance with an aspect described herein.

In some configurations, question selection could be accomplished implicitly through weights. For example, questions with a weight close to 0 would play very little role in the final counterfeit decision. Further configurations may rank questions for selection. Turning now to FIG. 3, an illustration is provided of an example ranking and selection of questions using counterfeit item detection system 200 of FIG. 2. Reference is now made to both FIG. 2 and FIG. 3.

In particular, the example provided by FIG. 3 depicts index 300A that comprises a first column having set of questions 302A and a second column having counterfeit indication weights 304A. Set of questions 302A can be associated with an item. Set of questions 302A is shown having a plurality of questions, including $Question_1$ through $Question_N$, which indicates that any number of questions can be included within set of questions 302A. Each question of set of questions 302A has an associated counterfeit indication weight within counterfeit indication weights 304A, illustrated as $X_1$ through $X_N$, which indicates that any number of counterfeit indication weights may be included as associated with set of questions 302A. Questions within set of questions 302A may be ranked based on their associated counterfeit indication weights within counterfeit indication weights 304A.

Further, each question may have one or more counterfeit indication weights. Thus, $X_1$ is intended to represent one or more counterfeit indication weights associated with $Question_1$, and so forth throughout index 300A, since each question of set of questions 302A may have more than one answer, each answer having an associated counterfeit indication weight. Index 300A may be stored in datastore 218 for use by aspects of counterfeit item detection engine 202. In an aspect, the ranking can be based on the strongest counterfeit indication weight for an answer of a question that correlates to determining whether the item is a counterfeit item. For instance, if a question has two answers, the answer with the counterfeit indication weight having the strongest correlation can be used to rank the question among a set of questions, such as set of questions 302A. The ranking could also be based on the greatest absolute value of the counterfeit indication weights. In another aspect, the counterfeit indication weights are ranked based on the strongest direct correlation for indicating a counterfeit item.

For instance, question selector 214 may select one or more questions from set of questions 302. As shown, question selector 214 has selected a top ranked number of questions, $Question_1$ though $Question_{10}$, as first selection 306A. Counterfeit item determiner 216 may provide first selection 306A during an item listing process. Following feedback as to whether the item is indicated as a counterfeit item, question ranker 212 modifies counterfeit indication weights 304A to provide modified counterfeit indication weights 304B and ranked set of questions 302A to provide the ranking shown in ranked set of questions 302B of index 300B. The ranking by question ranker 212 is illustrated by arrow 308. Index 300B is the same index as index 300A. However, index 300B illustrates ranked set of questions 302B associated with modified counterfeit indication weights 304B after the application of question ranker 212 in response to feedback.

As illustrated, the process may continue with second selection 306B selected from ranked set of questions 302B based on counterfeit indication weights 304B using question selector 214. Second selection 306B can be provided to a third-party seller during a second item listing process in response to a second item listing request using counterfeit item determiner 216. As illustrated, second selection 306B includes $Question_1$ through $Question_7$, $Question_{13}$, $Question_{17}$, and $Question_{23}$. As illustrated, and based on the ranking, second selection 306B includes some questions that are not included in first selection 306A.

The selection of questions can be provided in any way. In one method, a chatbot is used and the questions are asked in an order based on the ranking until a threshold confidence is determined, until a predetermined number is asked, or until a probability value is determined that statistically will not exceed a counterfeit indication threshold within a predetermined number of subsequent questions.

It will be understood that the indices illustrated by index 300A and 300B are one example of how questions and counterfeit indication weights may be indexed and stored in datastore 218. Other methods of indexing the information in a manner in which it can be recalled by aspects of counterfeit item detection engine 202 can be used and are intended to be within the scope of this invention.

Figure 4:
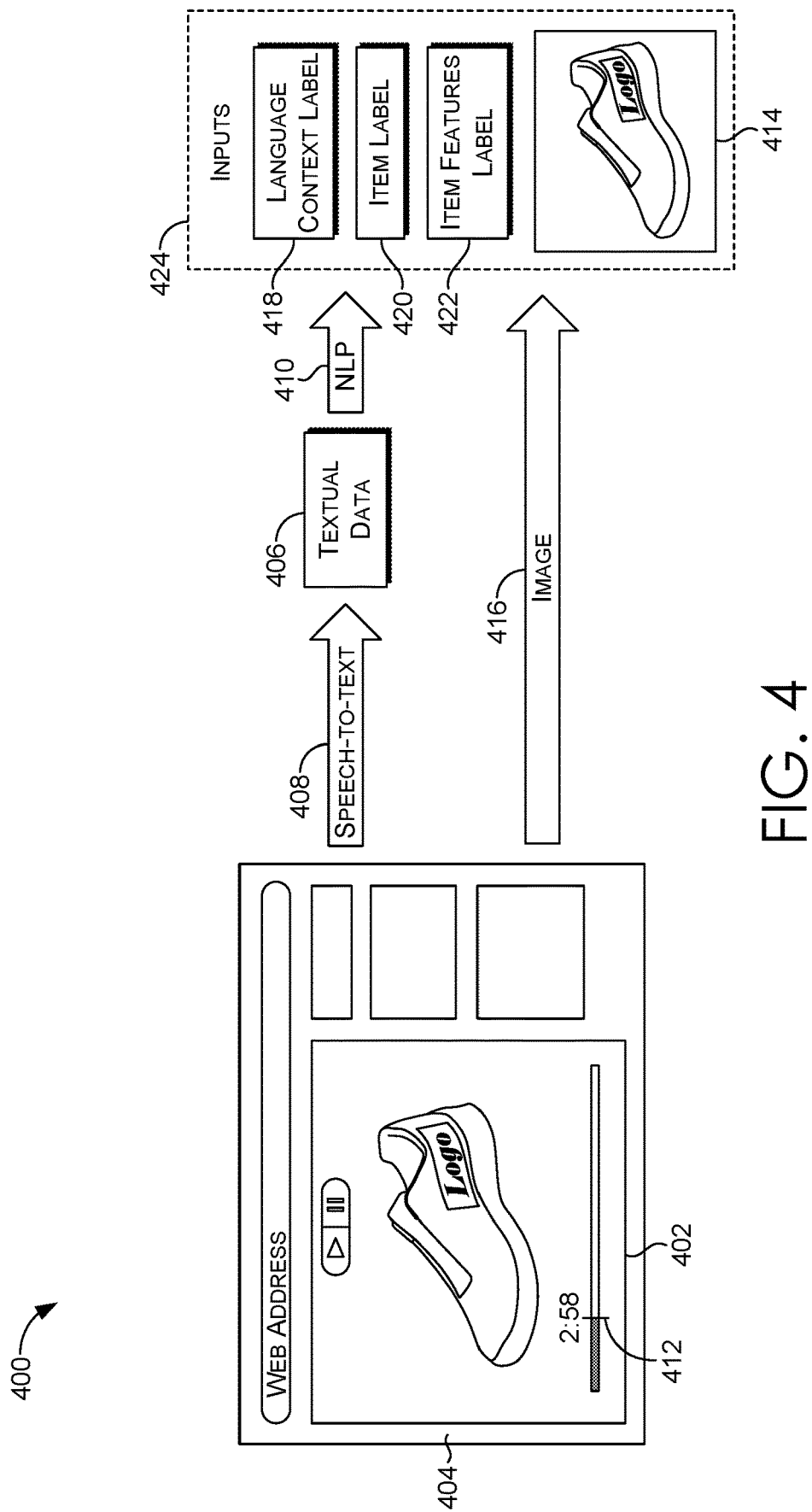
FIG. 4 is a diagram illustrating an example process performed by the counterfeit item detection system of FIG. 2, in accordance with an aspect described herein.

Referring now to FIG. 4, an example diagram 400 is provided illustrating a process performed by counterfeit item detection system 200 for identifying training data for a machine learning model to detect counterfeit items using images.

With reference to both FIG. 2 and FIG. 4, video 402 of an item is received. Video 402 can be received from any entity, including consumers, third-party sellers, retailers, manufacturers, government agencies, and the like. Video 402 may be received from the Internet or another network. In an aspect, video 402 is identified and collected using a web crawler. Video 402 can be collected using item data collector 204.

Counterfeit item detection engine 202 can employ natural language processing engine 206 to determine whether the collected video relates to the item. Natural language processing engine 206 can analyze text associated with video 402, for example, text that is included on webpage 404 from which video 402 is retrieved, or other text associated with video 402 Likewise, natural language processing engine 206 can analyze metadata accompanying video 402 to determine whether video 402 relates to the item. Further, natural language processing engine 206 can determine whether video 402 relates to the item by employing speech-to-text and then identifying textual elements representing the item from textual data 406.

Once determined to relate to the item, natural language processing engine 206 employs a speech-to-text software to convert audio within video 402 into textual data 406, as illustrated using arrow 408. Natural language processing can be employed on textual data 406 as previously described to identify textual elements that represent items, item features, and/or language context, as illustrated by arrow 410.

When the identified language context relates to detecting counterfeit items, image 414 from video 402 at a corresponding time is obtained. That is, the audio of video 402 has a time corresponding to the visual aspects of video 402. The audio is converted by the speech-to-text software to textual data 406, and as such, textual elements of textual data 406 have a time corresponding to the audio and also the visual aspects of video 402. Shown in FIG. 4 as time 412. The context relating to detecting counterfeit items is determined from the textual elements, and thus, the time associated with the context, the item, and the item features within textual data 406 can be identified, along with the corresponding time in video 402. As illustrated in FIG. 4, image 414 is obtained from video 402 at time 412, as represented by arrow 416.

Image 414 may be labeled (e.g., tagged or otherwise associated with) language context label 418, which indicates the identified language context, item label 420, which indicates the identified item, or item features label 422, which indicates the identified item feature(s). Image 414 and any labels are provided as inputs 424 for machine learning engine 210 to train a machine learning model. Inputs 424 may be stored in datastore 218 within training data set 224 for later use by machine learning engine 210 to train machine learning models. One suitable machine learning model for training to detect counterfeit items is a convolutional neural network. Machine learning engine 210 outputs a trained machine learned model that can be applied to subsequently received images, such as an item listing image provided in response to a question, to detect counterfeit items from the images.

Regarding FIGS. 5-8, block diagrams are provided to illustrate methods for detecting counterfeit items. The methods may be performed using the counterfeit item detection engine 202. In embodiments, one or more computer storage media having computer-executable instructions embodied thereon that, when executed, by one or more processors, cause the one or more processors to perform the methods. The method may be part of computer-implemented methods implemented by systems that include computer storage media and at least one processor. It will be recognized that the methods described within FIGS. 5-8 are example methods and that other methods can and will be derived from the described technology.

Figure 5:
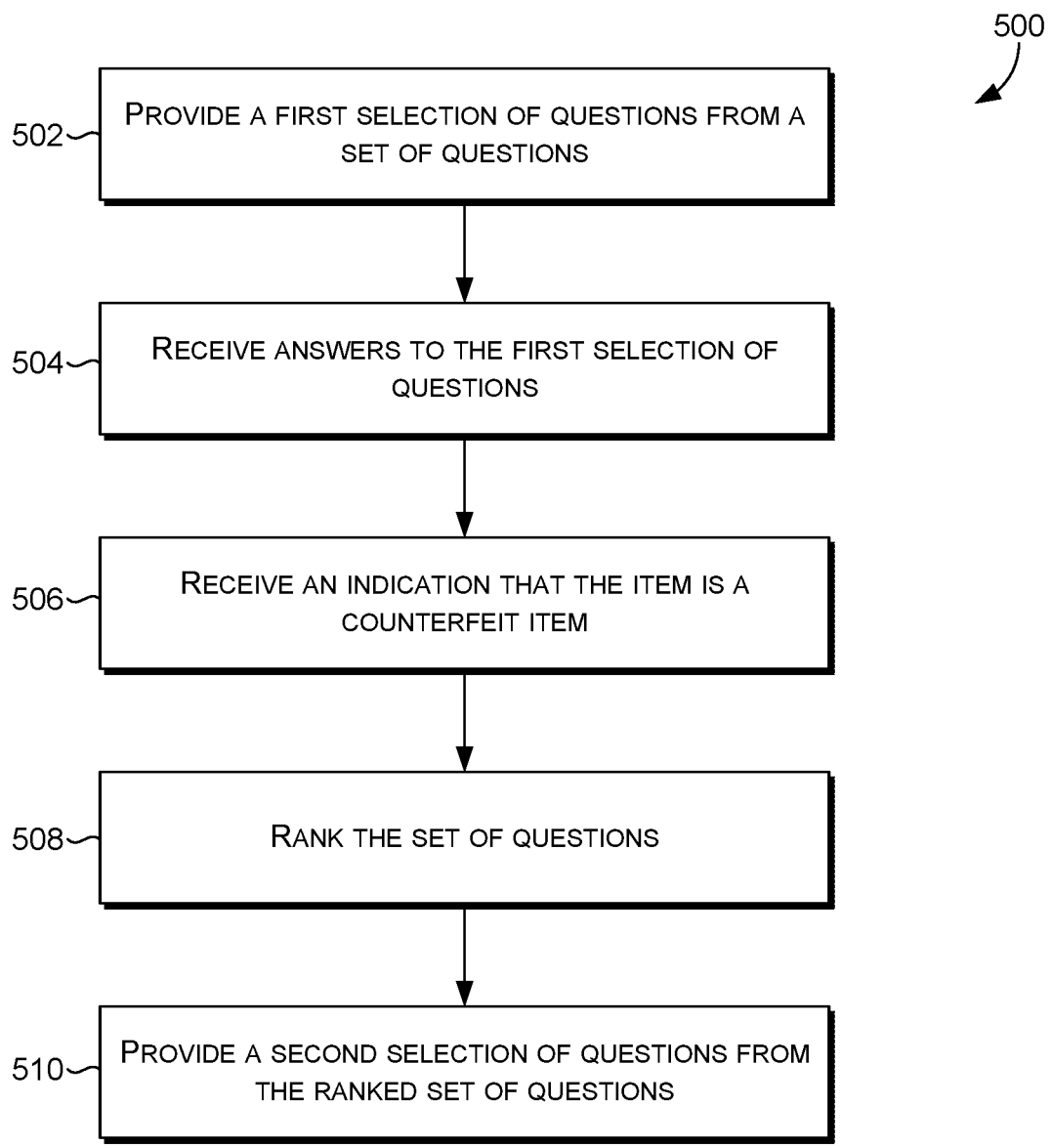
FIGS. 5-8 are block diagrams illustrating example methods of detecting counterfeit items using the counterfeit item detection system of FIG. 2.

FIG. 5 illustrates a block diagram of example method 500 for detecting counterfeit items. At block 502, a first selection of questions from a set of questions is provided. The first selection of questions may be provided in response to a first item listing request. The first selection of questions may be presented during an item listing process initiated in response to the first item listing request. Counterfeit item determiner 216 of FIG. 2 can be employed to provide the first selection of questions as part of the item listing process. The first selection of questions can be provided to a third-party seller at a client device. At block 504, answers to the first selection of questions are received. The answers may be received from the client device as provided by the third-party seller.

The set of questions includes generated questions. To generate a question, a natural language processing model can be used to identify an item feature from textual data and identify a language context associated with the identified item feature. The natural language processing model can be employed by natural language processing engine 206. The question is generated with the identified item feature when the language context relates to counterfeit item detection and is included within the set of questions. The question can be generated by employing language rules using question generator 208. Another question can be generated by determining textual data from a video comprising an item. The textual data can be determined using natural language processing engine 206. An item feature is then identified along with a language context related to counterfeit item detection using the natural language processing model of natural language processing engine 206. The question is generated to request an item listing image that comprises the identified item feature. The questions are generated for inclusion within the set of questions.

At block 506, an indication that the item is a counterfeit item is received. The indication can be received from any entity, including the third-party seller, a consumer, and so forth, as previously described. At block 508, the set of questions is ranked. This can be performed using question ranker 212 of FIG. 2. The set of questions can be ranked based on a correlation between the answer to the first selection of questions and the item being a counterfeit item. In some cases, the ranking is based on counterfeit indication weights that indicate a strength of the correlation between the answers to the first selection of questions and the item being the counterfeit item. The method may include modifying the counterfeit indication weights associated with the first selection of questions based on the indication that the item is the counterfeit item. Ranking the set of questions provides a ranked set of questions. It will be understood that the set of questions may have a prior ranking and that ranking the set of questions also provides the ranked set of questions in the form of a re-ranked set of questions.

At block 510, a second selection of questions from the ranked set of questions is provided. The second selection of questions may be provided in response to a second item listing request and as part of a second item listing process. The second selection of questions can be provided by counterfeit item determiner 216. The second selection of questions can be selected from the ranked set of questions using question selector 214. Answers to the second selection of questions may be received and may include an item listing image in response to a question of the second selection of questions requesting the item listing image. Method 500 may further include rejecting the second item listing request based on answers provided to the second selection of questions. A trained machine learned model may determine that the item associated with the second item listing request is a counterfeit item using the item listing image, and the rejection of the second item listing request may be performed based on this determination.

Figure 6:
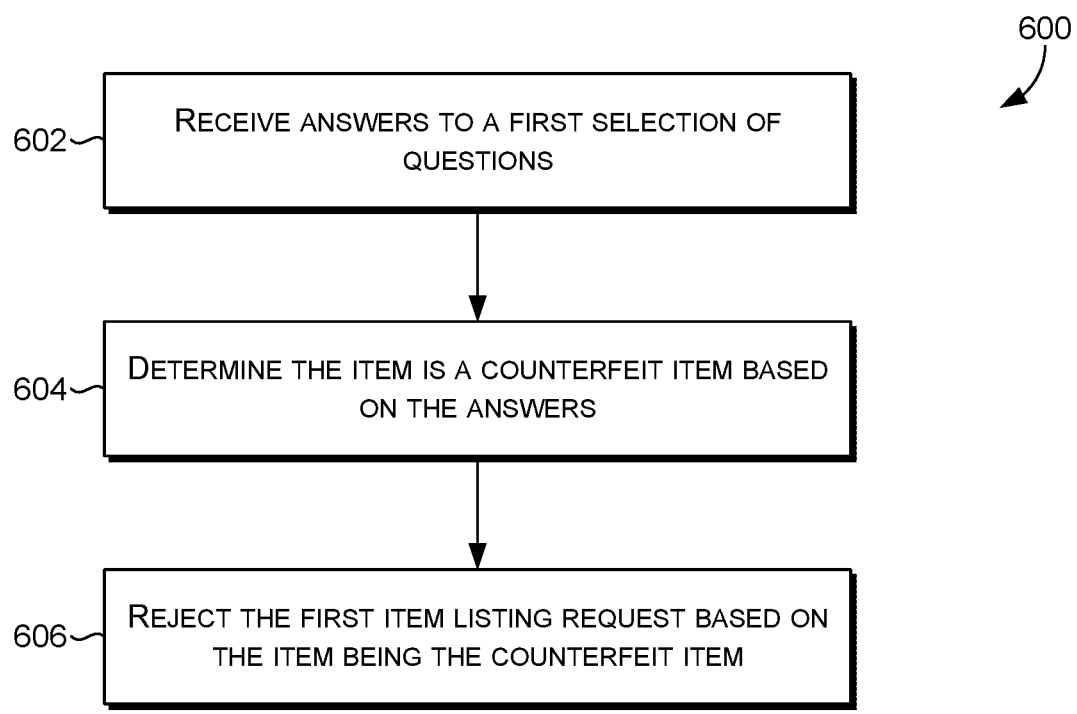

FIG. 6 provides a block diagram illustrating example method 600 for detecting a counterfeit item. At block 602, answers to a first selection of question are received. The first selection of questions may be provided to a client device of a third-party seller in response to a first item listing request for an item. The first selection of questions can be selected from a ranked set of questions using question selector 214 of FIG. 2. The ranking of the set of questions may be performed using question ranker 212 and be based on identifying a counterfeit item and correlating previous answers to a previous selection of questions as associated with the counterfeit item.

At block 604, the item is determined to be a counterfeit item based on the answers to the first selection of questions. The determination may be made using counterfeit item determiner 216. The determination that the item is the counterfeit item may be made by determining a probability value based on the answers to the first selection of questions and counterfeit indication weights associated with the first selection of questions. At block 606, the first item listing request is rejected based on the item being the counterfeit item.

Method 600 may also include re-ranking the set of questions based on determining that the item is the counterfeit item. The re-ranking can be performed by question ranker 212. The re-ranking may be based on modified counterfeit indication weights, where counterfeit indication weights indicate a strength of correlation between the answers to the first selection of questions and the item being the counterfeit item. A second selection of questions selected from the re-ranked set of questions can be provided in response to a second item listing request. Method 600 may include generating questions for inclusion in the ranked set of questions. The questions may be generated similar to the method 500, and may also be done using question generator 208.

Figure 7:
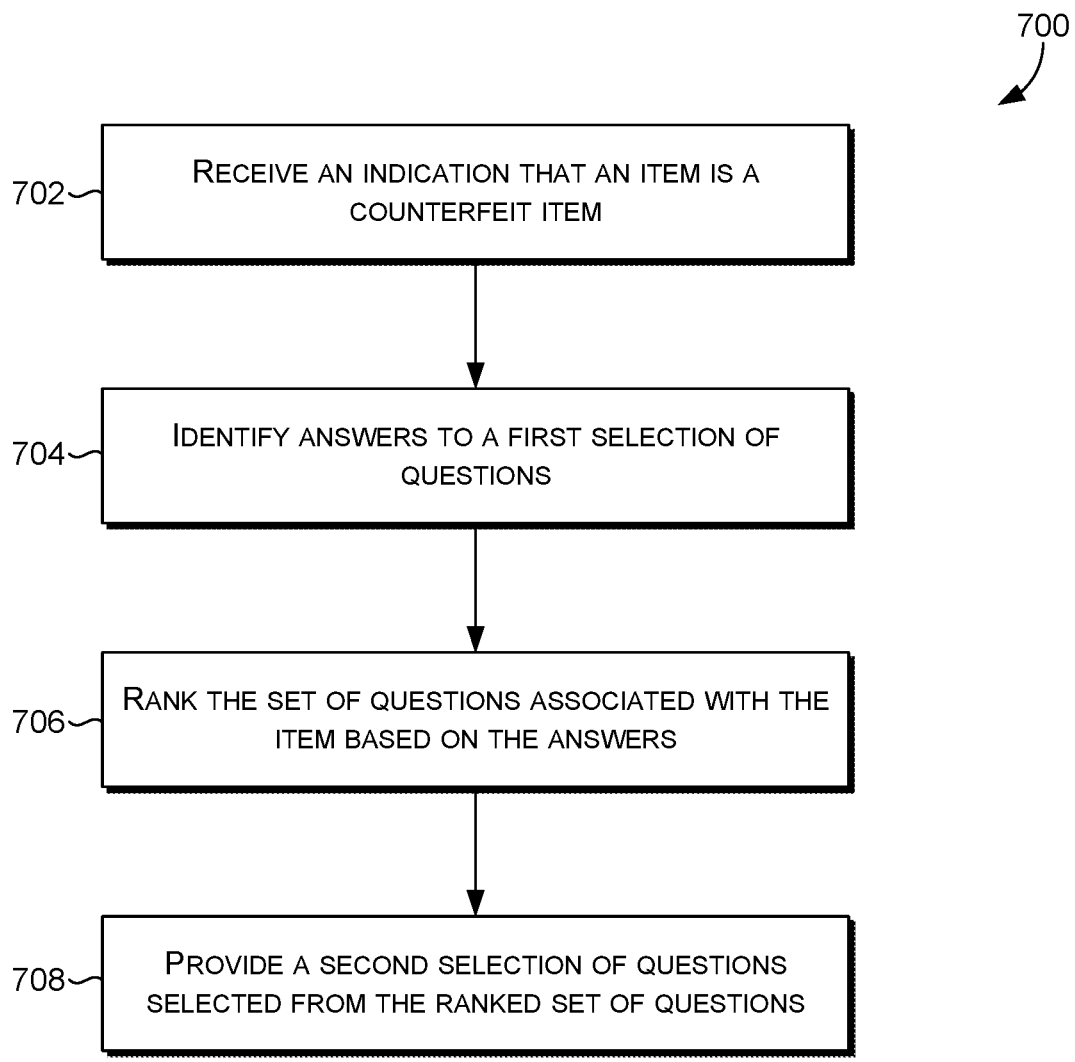

FIG. 7 provides a block diagram illustrating another example method 700 for detecting counterfeit items. At block 702, an indication that an item is counterfeit is received. The indication may be received from any entity as previously described. At block 704, answers to a first selection of questions are identified. The first selection of questions is selected from a set of questions associated with the item. The answers to the first selection of questions may include an item listing image.

In some cases, a question within the set of questions is generated by using a natural language processing model, such as that employed by natural language processing engine 206, to identify an item feature of the item from textual data having a language context related to counterfeit item detection. Language rules, such as those employed by question generator 208, may be employed to generate the question based on the item feature in response to the language context being related to counterfeit item detection.

At block 706, the set of questions associated with the item is ranked to provide a ranked set of questions. The ranking may be based on the answers to the first selection of questions being correlated to the counterfeit item. For instance, the set of questions can be ranked using modified counterfeit indication weights. Modifications to counterfeit indication weights associated with the first selection of questions can be made using question ranker 212 based on the indication that the item is counterfeit, where the counterfeit indication weights indicate a strength of correlation between the answers to the first selection of questions and the item being the counterfeit item.

At block 708, a second selection of questions is provided from the ranked set of questions associated with the item. The second selection of questions may be selected from the ranked set using question selector 214. The second selection of questions may be provided during an item listing process in response to an item listing request. In some cases, the second selection of questions comprises questions from the ranked set of questions that are not included within the first selection of questions.

Method 700 may further comprise labeling the first item listing image as counterfeit and providing the labeled first item image to a machine learning model (assuming the image is an image of the actual item, not a stock photo of a genuine item). This can be performed using machine learning engine 210. The labeled first item image may be included within a training data set for use by machine learning engine 210 in training the model to identify counterfeit items. If an answer to the second selection of questions includes a second item listing image, the trained machine learned model, output by machine learning engine 210 at least partially based on the labeled first image, is utilized to determine whether the second item listing image includes the counterfeit item. If the item is determined to be counterfeit, a second item listing request associated with a second item listing process providing the second selection of questions can be rejected.

Figure 8:
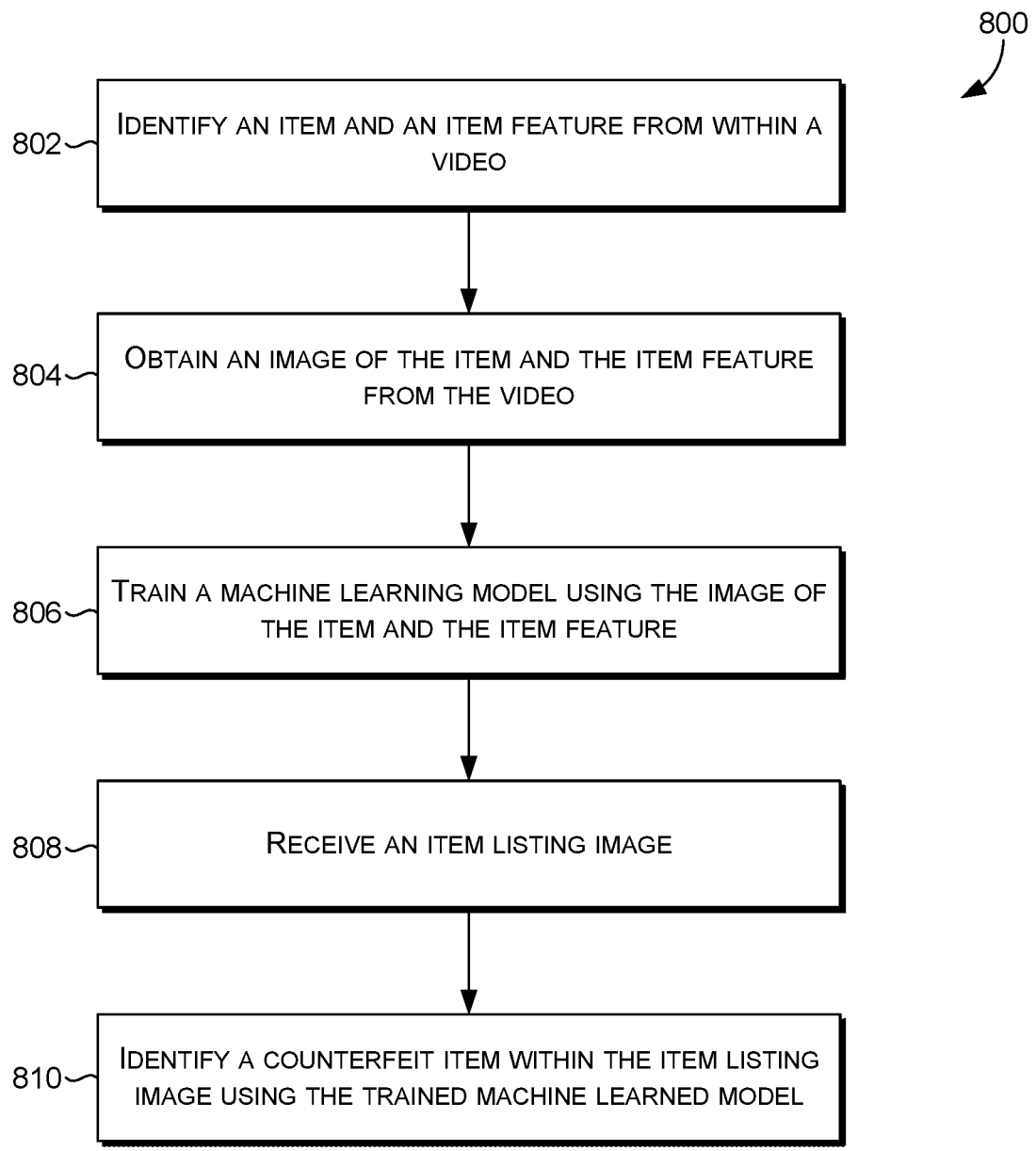

FIG. 8 provides a block diagram illustrating another example method 800 for detecting a counterfeit item. At block 802, an item and an item feature are identified from within a video. The item and the item feature may be identified from textual data of the video as converted by a speech-to-text software and identified using a natural language processing model provided by natural language processing engine 206.

At block 804, an image is obtained of the item and the item feature. The image is obtained from the video. The image can be obtained at a time corresponding to the use of the item and item feature within the textual data and the video. The image may be obtained in response to a language context of the textual data being identified as related to counterfeit item detection. The image can be labeled with the identified item, item feature, or language context. At block 806, the labeled image of the item and item feature is used to train a machine learning model. The labeled image is used as part of a training data set that is used to train the machine learning model. Machine learning engine 210 can be employed to train the machine learning model using the labeled image to output a trained machine learned model for use in identifying counterfeit items.

At block 808, an item listing image is received. The item listing image can be received as an answer to a question provided as part of an item listing process by counterfeit item determiner 216 in response to an item listing request. At block 810, the item within the item listing image is identified as a counterfeit item by the trained machine learned model. In response to identifying the item as the counterfeit item, the item listing request may be rejected. In some cases, the item listing image is then provided to the training data set for further training the machine learning model. The item listing image may be provided to the training data set after receiving a confirmation that the item is a counterfeit item from another source.

Figure 9:
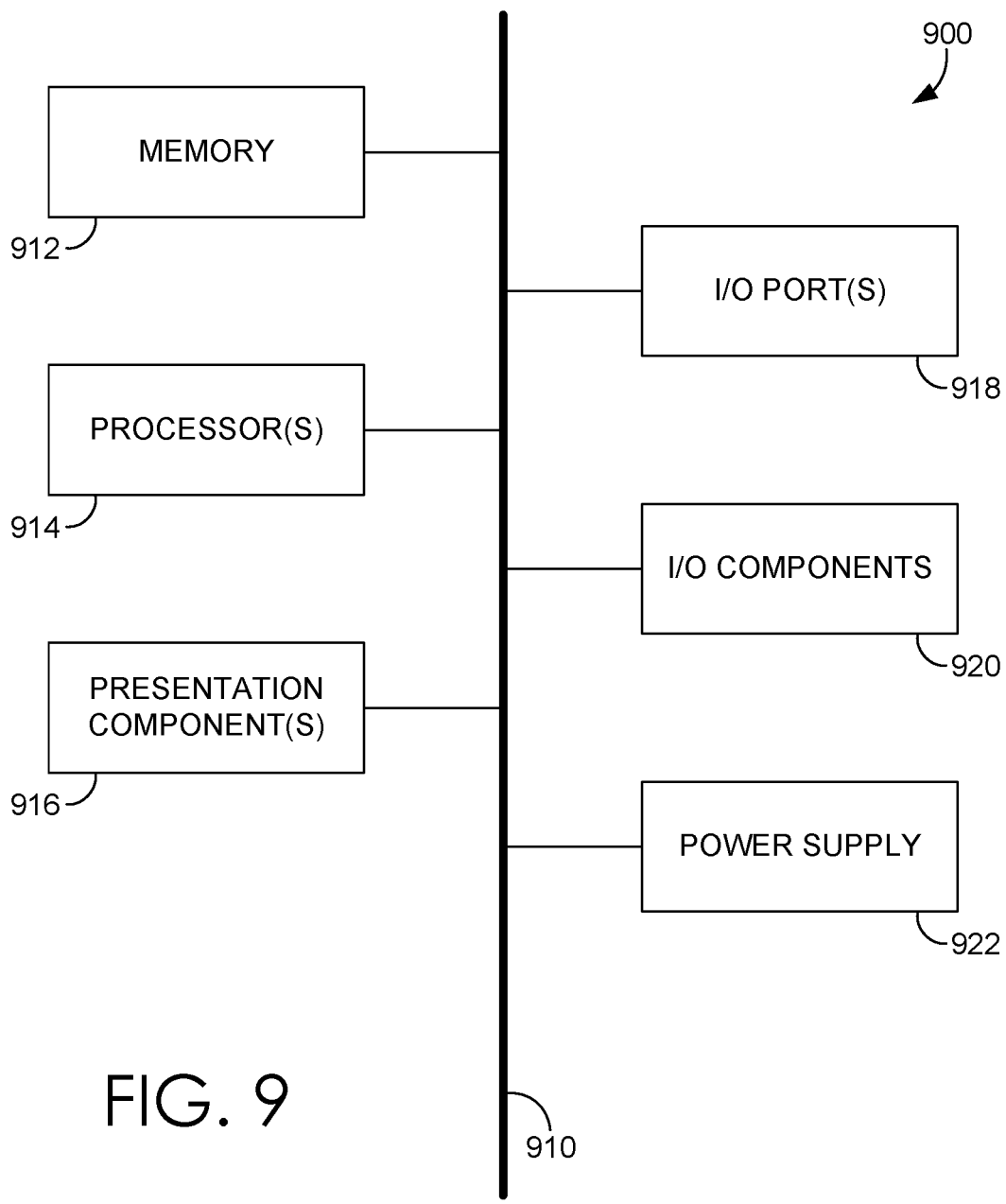
FIG. 9 is an example computing device suitable for implementing aspects of the described technology, in accordance with an aspect described herein.

Having described an overview of embodiments of the present technology, an example operating environment in which embodiments of the present technology may be implemented is described below in order to provide a general context for the various aspects. Referring initially to FIG. 9, in particular, an example operating environment for implementing embodiments of the present technology is shown and designated generally as computing device 900. Computing device 900 is but one example of a suitable computing environment and is not intended to suggest any limitation as to the scope of use or functionality of the technology. Neither should computing device 900 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With continued reference to FIG. 9, computing device 900 includes bus 910 that directly or indirectly couples the following devices: memory 912, one or more processors 914, one or more presentation components 916, input/output ports 918, input/output components 920, and illustrative power supply 922. Bus 910 represents what may be one or more busses (such as an address bus, data bus, or combination thereof).

Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. This is the nature of the art, and it is reiterated that the diagram of FIG. 9 merely illustrates an example computing device that can be used in connection with one or more embodiments of the present technology. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile or nonvolatile memory. The memory may be removable, non-removable, or a combination thereof. Example hardware devices include solid-state memory, hard drives, optical-disc drives, etc. Computing device 900 includes one or more processors that read data from various entities such as memory 912 or I/O components 920. Presentation component(s) 916 present data indications to a user or other device. Examples of presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to a counterfeit item detection system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

What is claimed is:

1. A computer-implemented method for counterfeit item detection:
providing a first selection of questions from a ranked set of questions in response to a first item listing request for an item;
receiving answers to the first selection of questions;
receiving an indication that the item is a counterfeit item;
training a machine learning model to rank questions based on the answers and the indication that the item is the counterfeit item;
re-ranking the ranked set of questions using the machine learning model based on a correlation between the answers to the first selection of questions and the item being the counterfeit item; and
providing a second selection of questions in response to a second item listing request for the item, the second selection of questions based on the re-ranked set of questions.

2. The computer-implemented method of claim 1, further comprising rejecting the second item listing request based on answers to the second selection of questions.

3. The computer-implemented method of claim 2, wherein the answers to the second selection of questions include an item listing image of an item feature of the item, and wherein the second item listing request is rejected based on the item listing image of the item feature.

4. The computer-implemented method of claim 1, further comprising modifying counterfeit indication weights associated with the first selection of questions based on the indication that the item is the counterfeit item, the counterfeit indication weights indicating a strength of the correlation between the answers to the first selection of questions and the item being the counterfeit item, wherein the re-ranking is based on the counterfeit indication weights.

5. The computer-implemented method of claim 1, further comprising:
using a natural language processing model to:
identify an item feature from textual data; and
identify a language context associated with the identified item feature; and
generating a question associated with the identified item feature when the language context relates to counterfeit item detection, the question generated for inclusion within the ranked set of questions.

6. The computer-implemented method of claim 1, further comprising:
determining textual data from a video comprising the item;
identifying an item feature and a language context related to counterfeit item detection from the textual data using a natural language processing model; and
generating a question requesting an item listing image comprising the item feature, the question generated for inclusion within the ranked set of questions.

7. The computer-implemented method of claim 1, wherein the first selection of questions is presented during an item listing process initiated in response to the first item listing request.

8. The computer-implemented method of claim 1, further comprising:
receiving a plurality of answers for a question within the first selection of questions; and
selecting an answer from the plurality of answers, the answer being selected based on the answer comprising a strongest correlating counterfeit indication weight of counterfeit indication weights associated with the plurality of answers.

9. A system for counterfeit item detection, the system comprising:
at least one processor; and
computer storage media storing computer-executable instructions that when executed by the at least one processor, cause the at least one processor to perform operations comprising:
training a machine learning model to rank questions based on received answers to the questions and indications of counterfeit items;
receiving answers to a first selection of questions provided in response to a first item listing request for an item, wherein the first selection of questions is selected from among a ranked set of questions, the ranking determined based on identifying a counterfeit item and correlating previous answers to a previous selection of questions as associated with the counterfeit item;
determining the item is counterfeit based on the answers to the first selection of questions;
rejecting the first item listing request based on the item being counterfeit;
using the machine learning model, re-ranking the ranked set of questions based on determining that the item is counterfeit; and
providing a second selection of questions in response to a second item listing request, the second selection of questions based on the re-ranked set of questions.

10. The system of claim 9, wherein re-ranking the ranked set of questions further comprises:
modifying counterfeit indication weights associated with the first selection of questions, the counterfeit indication weights indicating a strength of correlation between the answers to the first selection of questions and the item being the counterfeit item; and
re-ranking the ranked set of questions using the modified counterfeit indication weights.

11. The system of claim 9, wherein the answers to the first selection of questions include an item listing image of an item feature of the item, and wherein the first item listing request is rejected based on the item feature of the item within the item listing image.

12. The system of claim 9, further comprising generating a question included within the ranked set of questions, the question generated by:
identifying, from textual data, an item feature associated with the item, the item feature identified using a natural language processing model;
identifying a language context associated with the identified item feature using the natural language processing model; and
generating the question associated with the item feature when the language context relates to counterfeit item detection.

13. The system of claim 9, further comprising presenting the first selection of questions during an item listing process initiated in response to the first item listing request.

14. The system of claim 9, where determining the item is counterfeit further includes:
determining a probability value based on the answers to the first selection of questions and counterfeit indication weights associated with the first selection of questions; and comparing the probability value to a counterfeit indication threshold value.

15. The system of claim 9, further comprising:

receiving a plurality of answers for a question within the first selection of questions; and selecting an answer from the plurality of answers, the answer being selected based on the answer comprising a strongest correlating counterfeit indication weight of counterfeit indication weights associated with the plurality of answers.

16. One or more computer storage media storing computer-executable instructions that, when executed by a processor, cause the processor to perform a method for detecting counterfeit items, the method comprising:

receiving an indication that an item is a counterfeit item;

identifying answers to a first selection of questions, the first selection of questions included within a ranked set of questions associated with the item;

training a machine learning model to rank questions based on the answers to the first selection of questions and the indication that the item is the counterfeit item;

using the machine learning model, re-ranking the ranked set of questions associated with the item based on the answers to the first selection of questions being correlated to the counterfeit item; and providing a second selection of questions selected from the re-ranked set of questions associated with the item, the second selection of questions being provided during an item listing process.

17. The media of claim 16, further comprising modifying counterfeit indication weights associated with the first selection of questions based on the indication that the item is the counterfeit item, the counterfeit indication weights indicating a strength of correlation between the answers to the first selection of questions and the item being the counterfeit item, wherein the ranked set of questions is re-ranked using the modified counterfeit indication weights.

18. The media of claim 16, wherein the second selection of questions comprises questions from the re-ranked set of questions that are not included within the first selection of questions.

19. The media of claim 16, wherein the ranked set of questions includes a question generated based on a natural language processing model identifying an item feature of the item from textual data having a language context related to counterfeit item detection.

20. The media of claim 16, further comprising:

receiving a plurality of answers for a question within the first selection of questions; and selecting an answer from the plurality of answers, the answer being selected based on the answer comprising a strongest correlating counterfeit indication weight of counterfeit indication weights associated with the plurality of answers.

* * * * *